US012327462B2

(12) United States Patent
Gupta et al.

(10) Patent No.: US 12,327,462 B2
(45) Date of Patent: Jun. 10, 2025

(54) SKILL-BASED WAGERING METHODS, DEVICES AND SYSTEMS INCLUDING VARIABLE GAME EQUIPMENT

(71) Applicant: Super Money Games, Inc., Las Vegas, NV (US)

(72) Inventors: Sameer Mohan Gupta, Las Vegas, NV (US); Ofir Ventura, Las Vegas, NV (US); Seth Schorr, Las Vegas, NV (US); Andrew M. Costello, Las Vegas, NV (US); Bryan O'Reilly, Las Vegas, NV (US)

(73) Assignee: Super Money Games, Inc., Las Vegas, NV (US)

( * ) Notice: Subject to any disclaimer, the term of this patent is extended or adjusted under 35 U.S.C. 154(b) by 365 days.

(21) Appl. No.: 17/883,859

(22) Filed: Aug. 9, 2022

(65) Prior Publication Data

US 2022/0383702 A1 Dec. 1, 2022

Related U.S. Application Data

(63) Continuation-in-part of application No. 17/354,118, filed on Jun. 22, 2021, now Pat. No. 11,620,877, which is a continuation-in-part of application No. 17/136,396, filed on Dec. 29, 2020, now Pat. No. 11,430,303, which is a continuation-in-part of application No. 16/947,037, filed on Jul. 15, 2020, (Continued)

(51) Int. Cl.
*G07F 17/32* (2006.01)

(52) U.S. Cl.
CPC ...... *G07F 17/3295* (2013.01); *G07F 17/3223* (2013.01); *G07F 17/3239* (2013.01); *G07F 17/3262* (2013.01); *G07F 17/3267* (2013.01); *G07F 17/3206* (2013.01); *G07F 17/3209* (2013.01)

(58) Field of Classification Search
CPC ...................................................... G07F 17/32
See application file for complete search history.

(56) References Cited

U.S. PATENT DOCUMENTS 2,223,255 A 11/1940 Koci
3,153,538 A 10/1964 Rogers (Continued)

OTHER PUBLICATIONS

Carter et al. "Player Identity Dissonance and Voice Interaction in Games." Proceedings of the 2015 Annual Symposium on Computer-Human Interaction in Play. 2015. Oct. 5, 2015. Retrieved on Feb. 25, 2022 from <https://dl.acm.org/doi/abs/10.1145/2793107.2793144>. 6 pages.

(Continued)

*Primary Examiner* — Omkar A Deodhar
(74) *Attorney, Agent, or Firm* — Snell & Wilmer L.L.P

(57) ABSTRACT

Embodiments of the invention comprise skill-based wagering games, systems and devices. In one embodiment of the invention, the game is configured so that the odds of winning the game, and thus the payout for a winning outcome, depends upon the game equipment which is selected to be used in playing the game. In other embodiments, the payouts or awards offered to players are fixed and the difficultly level for achieving a winning outcome is adjusted by changing the game equipment used to play the game.

17 Claims, 7 Drawing Sheets

Related U.S. Application Data now Pat. No. 11,250,673, which is a continuation of application No. 16/293,947, filed on Mar. 6, 2019, now Pat. No. 10,720,026, which is a continuation of application No. 15/983,424, filed on May 18, 2018, now Pat. No. 10,262,503.

(60) Provisional application No. 62/509,305, filed on May 22, 2017.

(56) References Cited

U.S. PATENT DOCUMENTS

| | | | |
|---|---|---|---|
| 4,754,967 | A | 7/1988 | Edler et al. |
| 4,787,633 | A | 11/1988 | Fritzmeier |
| 4,787,634 | A | 11/1988 | Gautraud |
| 4,856,787 | A | 8/1989 | Itkis |
| 4,930,775 | A | 6/1990 | Hoffman |
| 6,017,278 | A | 1/2000 | Benko |
| 6,050,895 | A | 4/2000 | Luciano, Jr. et al. |
| 8,864,572 | B2 | 10/2014 | Oberberger |
| 9,251,567 | B1 | 2/2016 | Armone et al. |
| 9,251,666 | B2 | 2/2016 | Oberberger |
| 9,418,521 | B1 | 8/2016 | Henrick |
| 10,055,941 | B2 | 8/2018 | Luciano, Jr. et al. |
| 10,262,503 | B2 | 4/2019 | Gupta et al. |
| 10,720,026 | B2 | 7/2020 | Gupta et al. |
| 2002/0068633 | A1 | 6/2002 | Schlaifer |
| 2008/0064467 | A1 | 3/2008 | Reiner |
| 2008/0153570 | A1 | 6/2008 | Esses et al. |
| 2009/0023492 | A1 | 1/2009 | Erfanian |
| 2009/0131174 | A1 | 5/2009 | Hutchinson-Kay et al. |
| 2009/0227313 | A1 | 9/2009 | Minka et al. |
| 2010/0022289 | A1 | 1/2010 | Menicou |
| 2013/0084930 | A1 | 4/2013 | Chang et al. |
| 2013/0273990 | A1 | 10/2013 | Oberberger |
| 2014/0187304 | A1 | 7/2014 | Malek |
| 2014/0370958 | A1 | 12/2014 | Lutnick |
| 2017/0084124 | A1 | 3/2017 | Brunet de Courssou |
| 2017/0100872 | A1 | 4/2017 | Basallo |
| 2017/0124812 | A1* | 5/2017 | Washington ........ G07F 17/3269 |
| 2018/0336765 | A1 | 11/2018 | Gupta et al. |
| 2019/0151739 | A1 | 5/2019 | Belsky |
| 2019/0197837 | A1 | 6/2019 | Gupta et al. |
| 2021/0035417 | A1 | 2/2021 | Gupta et al. |
| 2021/0118267 | A1 | 4/2021 | Gupta et al. |

OTHER PUBLICATIONS

PCT Search Report and Written Opinion for International Application No. PCT/US2021/065041, mailed Mar. 11, 2022, 13 pages.

Brunswick Bowling Center Products, Spark Immersive Bowling, www.brunswickbowling.com/uploads/document-library/Bowling-Center-Products-Fullr.pdf, 93 pages, date unknown.

* cited by examiner

SKILL-BASED WAGERING METHODS, DEVICES AND SYSTEMS INCLUDING VARIABLE GAME EQUIPMENT

RELATED APPLICATION DATA

This application is a continuation-in-part of U.S. application Ser. No. 17/354,118, filed Jun. 22, 2021, which is a continuation-in-part of U.S. application Ser. No. 17/136,396, filed Dec. 29, 2020, which is a continuation-in-part of U.S. application Ser. No. 16/947,037, filed Jul. 15, 2020, now U.S. Pat. No. 11,250,673, which is a continuation of U.S. application Ser. No. 16/293,947, filed Mar. 6, 2019, now U.S. Pat. No. 10,720,026, which is continuation of U.S. application Ser. No. 15/983,424, filed May 18, 2018, now U.S. Pat. No. 10,262,503, which claims priority to U.S. Provisional Application Ser. No. 62/509,305, filed May 22, 2017, the contents of said prior applications are incorporated by reference as if set forth in their entirety herein

FIELD OF THE INVENTION

The present invention relates to skill based gaming, and particularly, wager-based gaming.

BACKGROUND OF THE INVENTION

A wide variety of wager-based or "gambling" games are known. These games have various rules and may be presented using a variety of equipment. For example, table games may be presented at a gaming table using equipment such as cards, dice, a roulette wheel or the like. Machine-based games may be presented via rotating reel slot machines, video slot machines, video poker machines and the like.

Gambling games are generally classified into two different types: (1) "chance" games—where the outcome of the game is primary dependent upon chance (even if some skill may be involved), and (2) "skill" games—where the outcome of the game is primarily dependent upon the skill of the player. In the United States, historically only wagering games of chance have been permitted. However, skill-type wagering gaming is a new focus.

There are significant problems confronted when trying to develop wager-based skill games. One problem is configuring the game so that the player has a reasonable opportunity to win their wager (and be awarded winnings), while at the same time offering some predictability of the game being profitable to the game operator.

In the case of "chance" type games, the player does not control the outcome of the event. Thus, the odds of a winning or losing outcome of the event can be more closely controlled to achieve these criteria. For example, in a slot-type game, the symbols on the slot reels and particular winning combinations of symbols then displayed by the slot reels can be carefully selected so that a random spinning of the reels results, on average, in a particular percentage of winning and losing outcomes. Generally, the game is designed so that the percentage of winning outcomes is sufficiently high—at least coupled with the payout for the winning outcomes, to make the game exciting to the player (a game may have a high frequency of winning outcome but then lower average payouts or might couple a lower frequency of winning outcomes with outcomes having higher payouts, in order to make the game exciting to the player).

The payouts for winning outcomes are selected so that, based upon the probabilities of winning and losing outcomes, the average player payback, e.g. the amount of wagers returned to players as winnings for winning outcomes, is less than 100%. In the case of a slot machine, the average payback may be selected to be in the range of 93%-97%. This means that the remaining 3%-7% of all wagers are lost and thus retained by the casino as winnings (often referred to as the house hold). In this scenario, each individual player is enticed to play the slot game because they perceive that they have a reasonable chance of receiving winnings. Yet, over the long term, there are a sufficient number of losing wagers that the house receives revenue associated with the offering of the game.

Video poker games are classified as games of chance, and yet they involve some skill by the player (in selecting cards to hold/discard, for example, from their initially dealt cards). However, winning poker hands can be chosen, along with their associated payout, so that even if a player plays with a perfect game strategy, the player return on wagers will average less than 100%, thus ensuring a house hold for the game operator.

Thus, one problem with skill-based wagering is how to design a skill-based game which offers wagering which is both attractive to the player and the house. In this regard, unlike games of chance, the probability of a player obtaining a winning outcome in a game of skill largely depends upon the player's skill (rather than chance).

What is needed are skill-based wagering games, systems and devices which offer individual players and/or groups of players the opportunity for attractive wager-activities having outcomes, and thus associated awards, which are primarily (if not solely) dependent upon the player's skill.

SUMMARY OF THE INVENTION

Embodiments of the invention comprise skill-based wagering games, systems and devices. In one embodiment of the invention, the configuration of a skill-based game is dependent the equipment which is used to play or present the game, where that game equipment may vary. In one embodiment, the game is configured so that the odds of winning the game, and thus the amount of the entry fee or wagers required to play the game or the payout for a winning outcome, depends upon the game equipment. For example, relative to a particular skilled-based event, a game which is presented with a first set of game equipment (such as a full set of golf clubs) may have first odds for a winning outcome and thus offer a first payout or winnings for achieving a particular outcome as compared to a game which is presented with a second set of game equipment (such as a limited set of golf clubs) which has second odds for a winning outcome and thus offers a second payout or winnings for achieving the same outcome (or where the winnings paid is the same but the entry fee or wager varies accordingly). In other embodiments, the payouts or awards offered to players (and entry fees or wagers) are fixed and the difficultly level for achieving a winning outcome is adjusted by changing or varying the game equipment.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise skill-based wagering games, systems and devices. In one embodiment of the invention, the configuration of a skill-based game is dependent upon the skill level of the player or players. In one embodiment, the game is configured so that the odds of winning the game, and thus the payout for a winning outcome, depends upon the game equipment which the player is provided or uses to play the game. For example, relative to a golf skilled-based event, a player who is provided a reduced club selection may be provided with an opportunity for a higher payout for a winning result than if the player is provided with a greater club selection. In another embodiment, a player might select a particular desired payout for a skill-based event, and the difficulty level of the event, as based upon the gaming equipment which is utilized, is adjusted so that the odds of achieving a winning outcome correspond to the desired payout.

Basic Principles of Skill Based Games of the Invention

First, the principles of the invention may apply to a wide variety of games now know or later developed. These games may comprise sports or sports-type games, amusement or entertainment games or the like, where such games include a skill component. As non-limiting examples, the principles of the invention may be applied to sports type games or events such as baseball, basketball, football, soccer, golf, driving/racing, bowling, Skee-ball, or video/virtual games (Candy Crush Saga®, Asteroids®, etc.), or various other types of games such as billiards/pool, card games, tile or word games (Scrabble®, Wordle®), chess, or other events now known or later developed, or aspects or features thereof (for example, relative to baseball, the event might comprise pitching to a target or hitting; relative to golf such might comprise putting or driving).

Figure 1A:
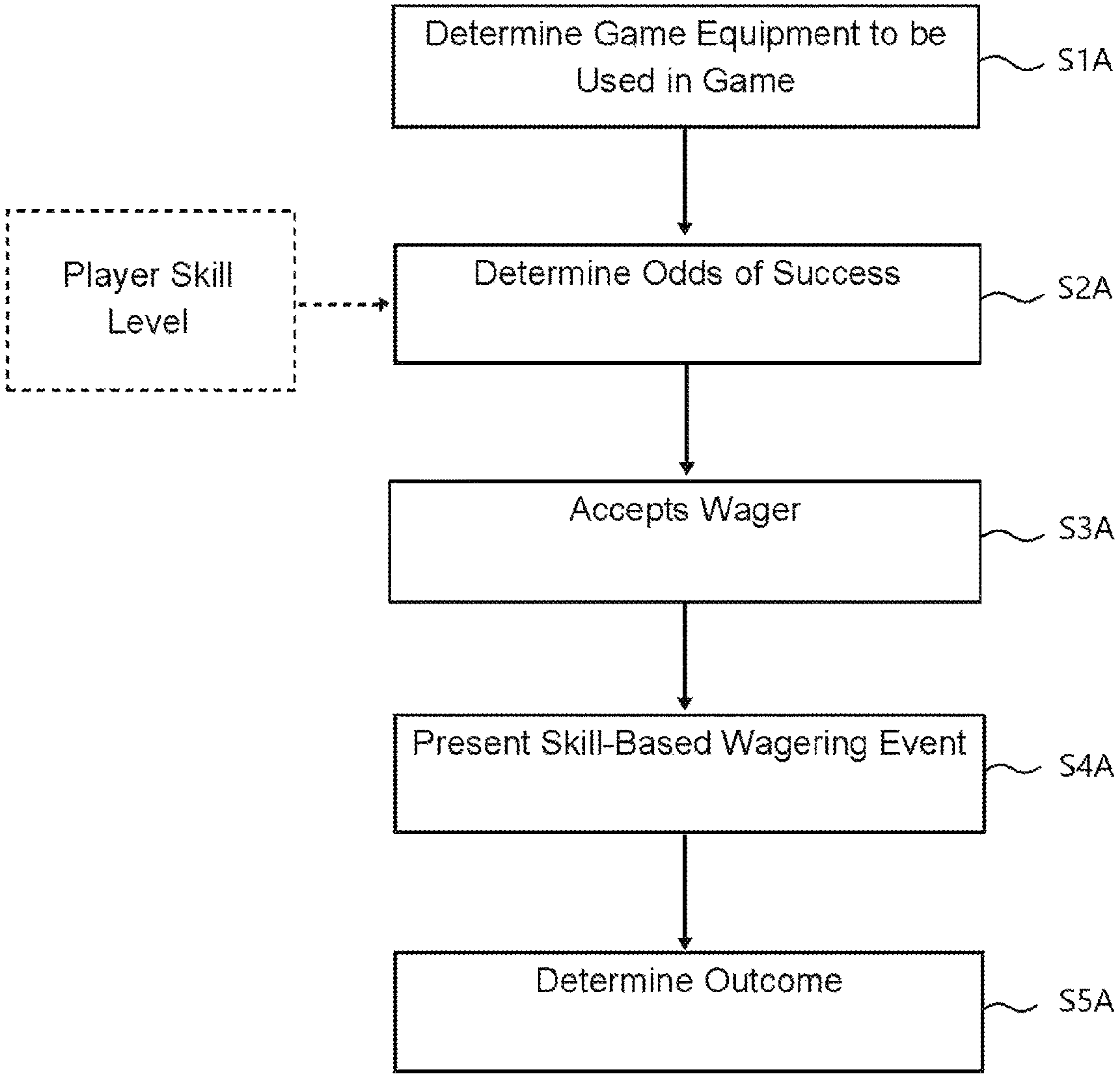
FIGS. 1A and 1B are flow diagrams of methodologies of the present invention.

FIG. 1A illustrates one principle of operation of the invention. In one embodiment of the invention, aspects of a difficulty of the event are determined. As detailed in the parent applications which are identified above and incorporated herein by reference, the difficulty of the event may vary based upon one or more different features or factors. Such factors may include the configuration of the event. This may comprise the nature of the event and how the event is implemented. For example, the event may comprise a golf putting event where the difficulty depends upon factors such as the cut or grass comprising the green, the shape/contour of the green, the pin placement, weather (wind, wet or dry green), distance to the hole, and the equipment used to play the event (type of putter). As another example, in a bowling event the difficulty may depend upon factors such as the lane configuration (including oil patterns), pin placement and ball weight.

In a preferred embodiment of the invention, in a step S1A, the configuration of the event is particularly determined with reference to equipment which is to be used in the game or event, wherein that equipment is variable. The equipment which is to be used might be selected by the operator, such by input to a gaming system or by random selection by the system or other selection by the system, or, more preferably, by the player. Of course, the game equipment which is selected is dependent upon the particular event. For example, if the game or event is a golf event, the equipment may comprise golf equipment such as different clubs, different numbers of clubs, different balls, and even different surfaces (types of grass, grass cuts) etc., whereas if the game or event is a virtual racing event, the equipment may comprise different cars or different features or characteristics of cars.

The equipment which is utilized might be selected as a package of equipment from one or more packages or sets of equipment, by selection of individual equipment or features thereof, or in various other manners. The equipment which is offered and the manner of selection may vary, such as based upon the game.

The equipment might comprise physical equipment and/or virtual equipment, such as depending upon how the game is presented. For example, physical equipment might comprise different golf clubs or sets of clubs (for example, in a golf driving event, a player might be permitted to select from a full set of drivers, only a 1-wood/driver, only a 3-wood and a 5-wood), in a bowling game, bowling balls of different weights (for example, the player might be permitted to select from 6 pound ball, a 10 pound ball or a 16 pound ball, different lane oil patterns, etc.), in a game of chess, different sets of playing pieces (for example, the player might be permitted to select a standard set of playing pieces as modified by replacing the two Bishops with two additional Queens, or a standard set as modified by replacing two Rooks with two additional Knights, or a standard set of pieces). Similarly, virtual equipment might comprise different equipment or equipment having different characteristics or features. For example, in a virtual racing game, the equipment might comprise different cars or different equipment (tires, suspension, engine, aero packages, etc.). In a word game, the equipment might comprise different sets of letter tiles, etc. Of course, other different types of game equipment variations might be offered/utilized. For example, in a game of virtual golf, the player might be permitted to select different gameplay surfaces, such as different types of grass and/or grass cuts (direction, length, etc.). In the game of bowling, the player might be permitted to select different lane oil patterns or other lane features. In some embodiments, aspects of the difficulty of the event, including the variable equipment, might comprise different game rules. For example, a bowling event might include a "no step" rule (which increases the difficulty of the event).

In a step S2A, the odds for the player achieving a winning outcome of the skill-based event area determined based upon the difficulty of the event, such as the selected game equipment. Of course, this determination is made in relation to the particular event which is being presented. For example, the odds for a player achieving a Hole-In-One on a Par-3 golf hole will be different than the odds of a player picking up a 7-10 split in bowling. Most importantly, however, the odds for the particular event are equipment variable, in that the odds of success for that particular event vary depending upon the equipment which is used to play/present the game or event.

Of course, the odds or probabilities of success/failure (based upon the selected game equipment) may be determined in various manners. In one embodiment, the odds or probabilities may be determined, for example, via an algorithm. The odds may be pre-calculated and be associated with each set of game equipment, whereby when a particular set of game equipment is selected, the odds are already known/associated therewith, such as in a data table.

In a step S3A, a payout is determined for a winning outcome of the skill-based event as to the player. In one embodiment, the payout is determined based upon the determined odds. For example, if the determined odds are 100% that the player will achieve a winning outcome, then the player may be offered a payout of only their wager (or their wager less a rake, commission or vigorish to the house)—since offering the player more than their wager means that the house will have to payout winnings to a player and have no expectation of revenue/winnings.

In one embodiment, higher winnings may be offered when there are lower odds of success. As another simplistic example, relative to a Player A who places a $100 wager and where it is determined that there is a 75% chance of success (based upon the selected game equipment), that player might be offered a payout of $125 (e.g. a return of their $100 wager and $25 in winnings) for a successful outcome. Player B who places a $100 wager and where it is determined that there is a 50% chance of success, might be offered a payout of $150 for a successful outcome.

As illustrated in FIG. 1A, in a step S5A, the player places their wager (which may also be referred to as an entry fee or by other terminology, such as a buy-in or the like) if they are amenable to the payout being offered to them (it is noted that the wager or entry fee could be placed before the above-reference steps or at other times; for example the player could place their wager or entry fee initially and then withdraw it if the offered payout is too low), and in a step S6A, the player participates in the skill-based event (e.g. the event is presented, the player's input(s) is/are received and the outcome of the event is determined—which as noted below, may be implemented by one or more skill-based gaming devices or systems).

If the player is unsuccessful in the event, e.g. loses, the player preferably loses their wager or entry fee to the house. If the player is successful in the event, e.g. achieves a winning outcome, the player preferably wins their wager or entry fee and is paid the defined winnings. The amount of the award is preferably at least partially dependent upon the payout value. For example, the payout value may be represented as 3 times the player's wager, such that the award for a winning outcome may comprise $300 in the event the player placed a $100 wager.

In the above-described configuration, different odds and then different payouts are determined and offered to one or more players of the event. In some embodiments, the different odds may be used to determine a different payout in terms winnings paid based upon the same wager or entry fee, or in the form of a different wager or entry fee in relation to the winnings paid. For example, in the examples described above, Player A and Player B placed the same entry fee or wager of $100, and then the different odds of those players achieving a winning outcome (based upon different game equipment) resulted in a determination of an award of winnings of $125 to Player A for a winning result and an award of winnings of $150 to Player B for a winning result. This may be expressed or implemented in the form of different entry fees or wagers. For example, in the same example, each player might be awarded $100 for a winning result of the event. However, Player A would be required to place an entry fee or wager of $75 and Player B would be required to place an entry fee or wager of only $50 for the same chance to win $100.

In another embodiment, the odds and/or payout for an event is selected or determined and then the difficultly level of the skill-based event, by varying the game equipment which is provided, to achieve the desired odds and payouts.

Figure 1B:
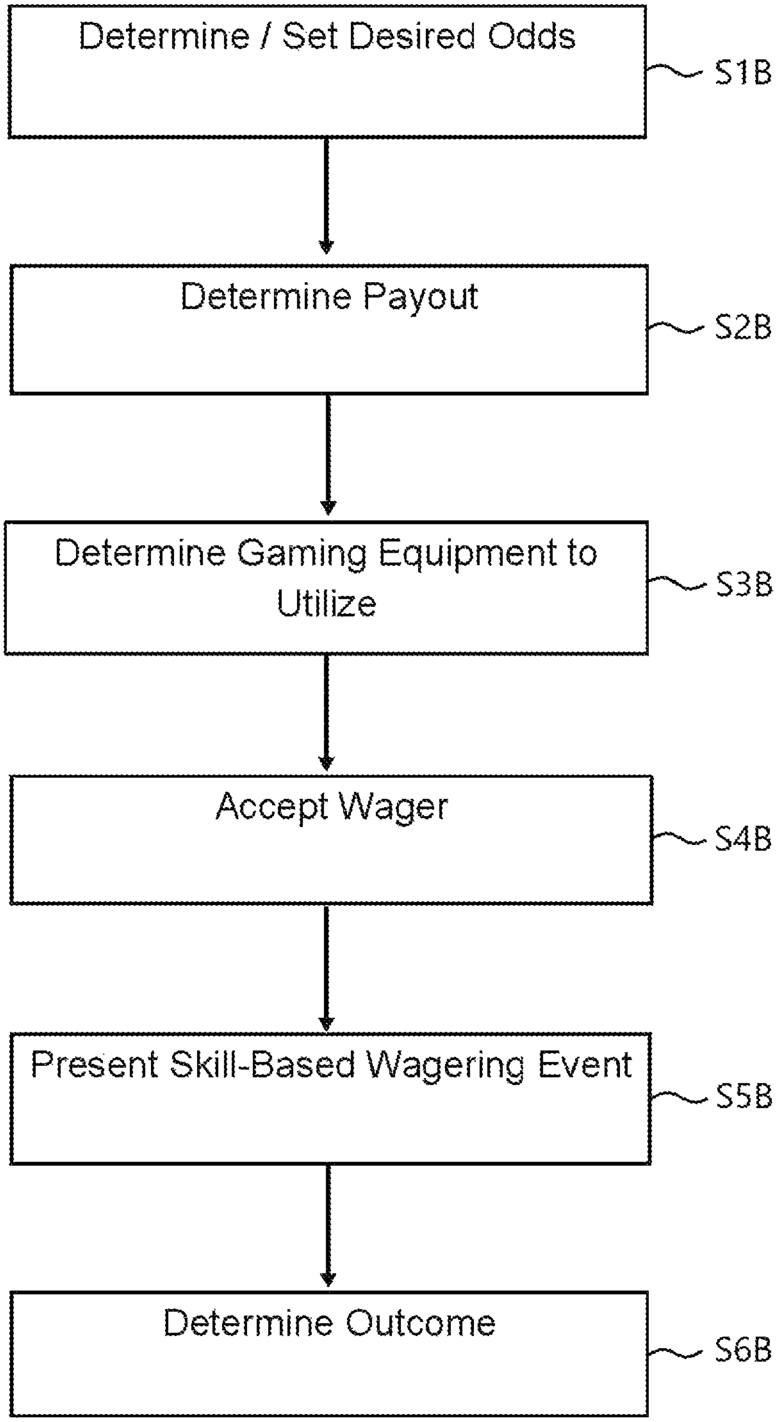

In this configuration, referring to FIG. 1B, in step S1B, desired odds are set or determined. This may be accomplished in various manners, such as by having the player select desired odds (or payouts, as described next) or by having the house select such.

In a step S2B, the payout for a winning outcome of the event is determined or set relative to the odds.

In a step S3B, the difficulty of the skill-based event is then determined or set. In a preferred embodiment, this comprises determining the game equipment which is used to present the event, wherein such equipment varies the difficulty of obtaining a winning outcome. As one example, the selected odds (e.g. the probability that the player will successfully complete the task) may be 50%. In a game of bowling where a player needs to pick up a 7-10 split, a player might be provided with a 10 pound ball, wherein it is calculated that a player using such a ball has a 50% chance of knocking down the pins, as compared, for example, to such a game where the player is provided with a 16 pound ball and it is calculated that the player has a 75% chance of success. In this manner, a player may be offered different odds and thus different payouts, by changing the game equipment which is provided to the player.

The remaining steps of this embodiment are otherwise the same as those described above.

Devices and Systems

The invention as described above may be implemented in various manners. In one preferred embodiment, the invention is machine-implemented or partially machine-implemented.

Figure 2:
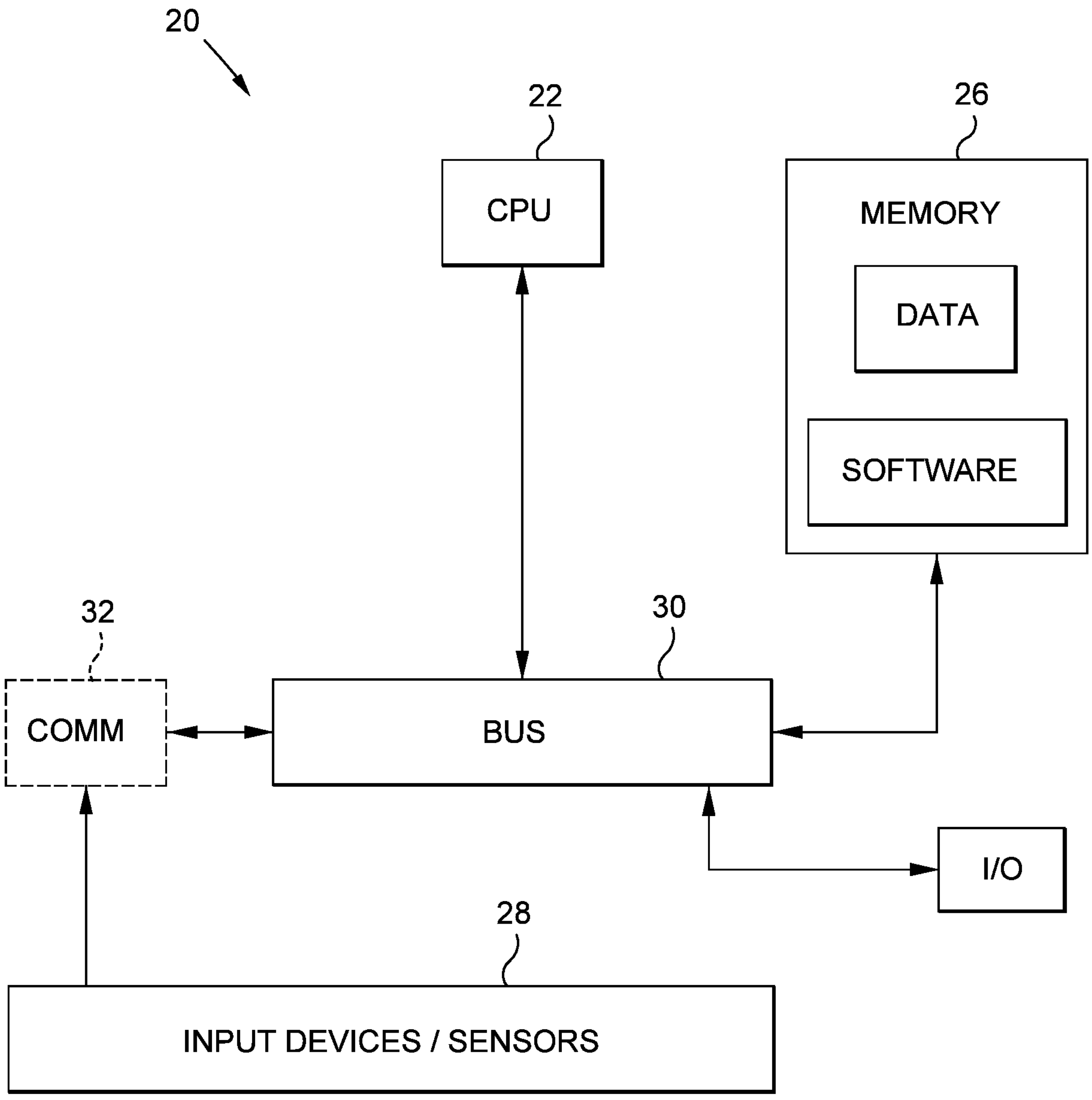
FIG. 2 schematically illustrates a device in accordance with the present invention.

FIG. 2 conceptually illustrates one embodiment of a specially made or configured skill-based gaming device in accordance with the present invention. In general, the device 20 comprises at least one processor or CPU 22, one or more memory or data storage devices 26, and one or more communication interfaces 28. In one embodiment, the processor 22 executes machine-readable code or software which is stored in the memory device 26.

As illustrated, the device 20 includes, or is configured to receive input from, one or more player input devices or sensors 28. In one embodiment, output or signals from the input devices or sensors 28 are provided to the CPU 22 for processing and/or might be provided to the one or more data storage devices 26 for storage. In another embodiment, the output or signals from the input devices or sensors 28 might be provided to one or more external processors or devices for pre-processing and then be provided to the CPU 22 and/or one or more data storage devices 26.

In one embodiment, the various components of the device 20 might be configured to communicate over one or more communication buses 30. The input devices or sensors 28 might be configured to communicate with the system bus 30 via one or more communication interfaces or ports. For example, the input devices or sensors 28 might be configured as USB devices, or might be configured as Internet devices and provide data in the form of TCP/IP packets.

In one embodiment, the device 20 may include one or more I/O devices. These might comprise, for example, a keyboard, mouse, video display or the like. These I/O devices may allow a user, such as an operator or a player, to interface with the device 20.

The one or more data storage devices 26 may store software which causes the CPU 22 to implement the functionality described above.

Of course, the device of the invention might have any number of configurations, including where elements of the device are distributed, such as by being associated with other devices or systems (distributed, etc.) or linked with other devices or systems.

Figure 3A:
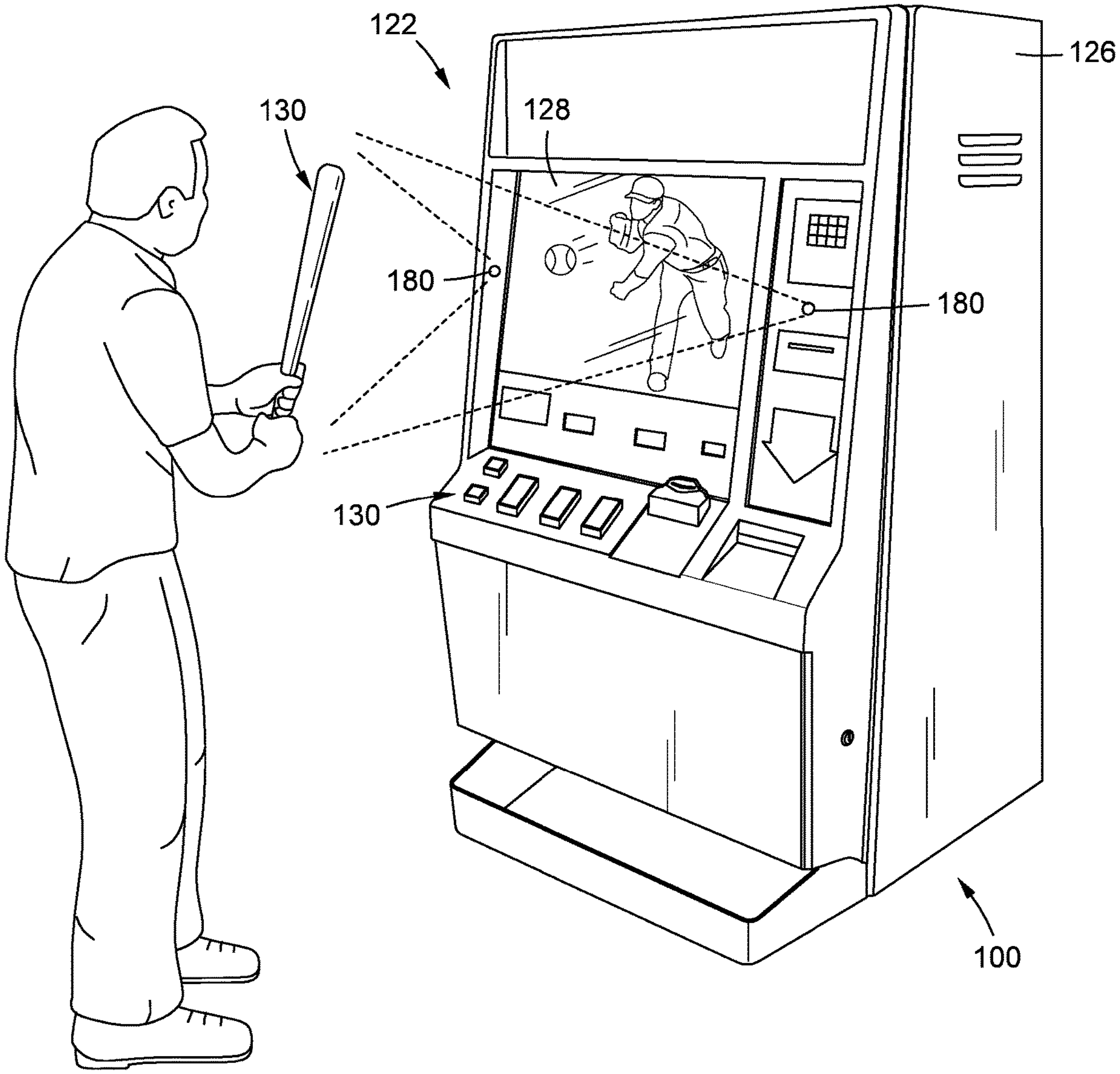
FIG. 3A illustrates a skill-based gaming device in accordance with one embodiment of the invention.

For example, FIG. 3A illustrates one embodiment of a device 100 of the invention configured as a special purpose or dedicated skill-based wagering/gaming machine or device 122. Because the device offers wagering, it may be located at a casino (and as such may be referred to as a "casino gaming device"), but it might be located in many other locations. Further, while the skill-based gaming device 122 might have a similar appearance to other wager-based gaming machines in a casino, as described herein, the skill-based gaming device 122 is substantially different from standard casino wagering machines such as video poker and slot machines, as described in detail herein.

As illustrated, the skill-based game device 122 may include a housing or cabinet 126 for supporting and/or enclosing various components required for operation of the device. In the embodiment illustrated, the housing 26 includes a door located at a front thereof, the door capable of being moved between an open position which allows access to the interior, and a closed position in which access to the interior is generally prevented. The configuration of the skill-based game device 122 may vary, such as by having different shapes, etc.

The skill-based game device 122 preferably includes at least one display device 28 configured to display the skill-based game or event information. The display device 128 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 128 may be capable of projecting or displaying a wide variety of information, including images, symbols and other indicia or information associated with game play, game promotion or other events. The skill-based game device 122 might include more than one display device 128, such as two or more displays 128 which are associated with the housing 126.

As indicated herein, the skill-based game device 122 is preferably configured to present one or more games upon a player making a monetary payment or wager. In this regard, as described in more detail below, the skill-based game device 122 includes a mechanism or means for accepting monetary value.

As described above, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the skill-based game device 122 preferably includes a mechanism or means for returning unused monetary funds and/or dispensing winnings to a player.

The skill-based game device 122 preferably includes one or more player input devices 130 (such as input buttons, plunger mechanisms, a touch-screen display, joystick, touch-pad or the like). These one or more devices 130 may be utilized by the player to facilitate game play, such as by providing input or instruction to the skill-based game device 122. For example, such input devices 130 may be utilized by a player to place a wager, cause the skill-based game device 122 to initiate a game, to provide skill-based game input, to "cash out" of the device, or to provide various other inputs.

In one preferred embodiment, the skill-based game device 122 includes at least one microprocessor or controller for controlling the device, including receiving player input and sending output signals for controlling the various components or peripheral devices of the machine 122 (such as generating game information for display by the display 128). The controller may be arranged to receive information regarding funds provided by a player to the device, receive input such as a purchase/bet signal when a purchase/bet button is depressed, and receive other inputs from a player. The controller may be arranged to generate information regarding a game, such as generating game information for display by the at least one display 128, for determining winning or losing game outcomes and for displaying information regarding awards for winning game outcomes, among other things.

The controller may be configured to execute machine readable code or "software" or otherwise process information, such as obtained from a remote server. Software or other instructions may be stored at a memory or data storage device, e.g. in a fixed or non-transitory configuration. The memory may also store other information or data, such as data stored in table or other forms (including, but not limited to look-up tables, pay tables and other information, including tracked game play information).

Preferably, as described in more detail below, the controller is configured to execute machine readable code or instructions (e.g. software) which are configured to implement the game. In this regard, the device is specially configured to present the game of the invention via specific software and/or hardware which causes the device to operate uniquely. For example, the controller of the skill-based game device 122 may be configured to detect a wager, such as a signal from a player's depressing of a bet or game play button.

As indicated, the skill-based game device 122 is configured to present one or more wagering games. The skill-based game device 122 is preferably configured to accept value, such as in the form of coins, tokens, paper currency or other elements or devices representing value such as monetary funds (such as by accepting coins via a coin acceptor 32, bills or monetary-value tickets by a media reader/acceptor 134, etc.). Of course, in such event the skill-based game device 122 may further be configured with one or more paper currency or ticket storage devices, such as cash boxes, and other paper currency or media handling devices (including transport devices). The skill-based game device 122 might also be configured to read FOBs, magnetic stripe cards or other media having data associated therewith and via which value or funds may be associated with the skill-based game device 122. The mechanism for accepting monetary value might also comprise hardware and/or software which allows a player to transfer (such as electronically) funds from an account, such as a casino wagering account, or a bank or other financial institution account. Such a mechanism might include a communication interface which permits the device to communicate with a mobile phone, PDA, tablet or other electronic device of the player (such as via a physical interface or wired or wireless communications links, such as to enable the transfer of funds from the player to the device or system).

When the player associates funds with the device or an associated system, a credit balance is generated. The credit balance may comprise a plurality of monetary value credits. The player may wager some or all of the associated monetary value, such as by wagering one or more of the credits associated with the credit balance. In one embodiment, when the player's wager is received, the player's credit balance is reduced by the number of wagered credits. The player might then provide a separate input to begin the game. Of course, other configurations may be implemented for accepting monetary value from the player and for allowing the player to place a wager from the associated monetary value.

In one embodiment, the skill-based game device 122 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the skill-based game device 122 to indicate their desire to cash out, such as by selecting a "cash out" button or touch screen feature or providing other input. In response, a monetary value represented by the player's credit balance or the like is preferably paid, transferred or otherwise provided to the player. For example, upon an award or at cash-out, associated funds may be paid to the player by the skill-based game device 122 dispensing coins to a coin tray. In another embodiment, funds may be issued by dispensing paper currency or other media. In yet another embodiment, a player may be issued a media, such as a printed ticket, which ticket represents the value which was paid or cashed out of the machine. In yet another embodiment, the cash-out might result in the dispensing of a card or other media which stores or represents the cashed-out funds, such as by writing funds information to a magnetic stripe of a card which is inserted into a media writer of the device or dispensed from the machine. In other embodiments, the cash-out mechanism may result in the funds value being transferred to an external device or account, such as a player's casino account (such as associated with a casino server), a remote bank or other financial account, or an electronic device such as a player's phone, PDA or tablet.

In some embodiment, the skill-based game device 122 may also include a player tracking device, such as a card reader 166 and associated keypad 170. Such player tracking devices are well known and may permit the game operator to track play of players of the device. The tracked play may be utilized to offer player bonuses or awards.

Preferably, the skill-based game device 122 is configured to generate and present one or more skill-based games as described above. Thus, the one or more input devices 130 are preferably configured to receive a player's skill-based game input to the skill-based game device 122. As described herein, various types of input devices or sensors may be used to receive that input (for example, FIG. 3A illustrates a skill-based game device 122 which includes buttons and motion detection sensors, such as for detecting a player's swing of a baseball bat).

As indicated, the skill-based game device 122 preferably also includes unique/specific software for implementing the features of the invention as described herein. For example, the software may include one or more modules that are configured to calculate odds and payouts for one or more events, present the event to the player (such as when executed, causing the CPU to cause the display information regarding the skill-based gaming event), receive the player's input (in this example, the game may comprise the display of a virtually pitched baseball which the player attempts to hit by swinging a bat and where sensors 180 are used to register the player's swing, where the CPU then determines the outcome of the event and then, if winning awards winnings). As described below, in other embodiments, various features or aspects of the invention may be implemented by a remote server (such as the step of determining a player's skill level, payouts, event difficultly), etc., wherein the skill-based game device 122 then serves as a game interface for the player.

Figure 3B:
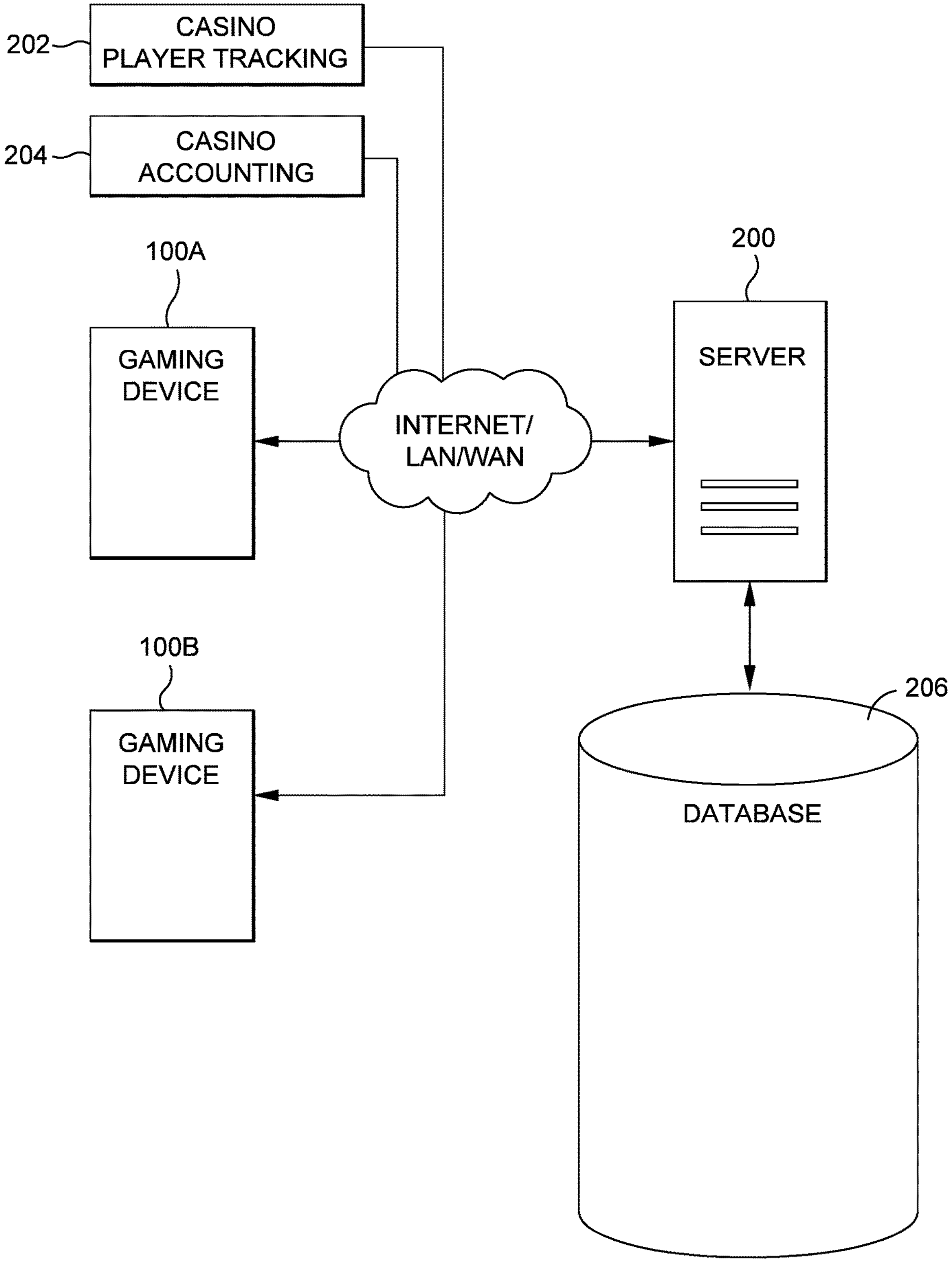
FIG. 3B illustrates one embodiment of a gaming system in accordance with the invention.

Of course, the skill-based game device 122 may be configured to generate and present games in a stand-alone manner or it may be in communication with one or more external devices at one or more times. For example, as illustrated in FIG. 3B, the skill-based game device 122 may be configured as a server-based device and obtain information from a remote game server 200 (in which event the device controller may receive game information from the server and use that server-generated information to present the game at the device).

For example, instead of comprising a dedicated purpose device, it is possible for the game of the invention to be presented on a computing device, including at a home or office computer or a player's mobile electronic device such as a PDA, phone or the like. In one embodiment, a player might log in to a game server and the controller of the game server may cause game information to be delivered to the player's computer via a communication link and then be displayed on a display of the player's computer. The communication link might comprise or include the Internet, a casino network such as a wired or wireless LAN, or combinations of public and/or private networks including wired and/or wireless links. In such a configuration, it will be noted that the term "controller" may comprise more than one device. For example, in a server-based environment, a controller at a server may generate game information and transmit that information to a local controller at a device or a player's computer or other electronic device. The local controller at the device or the player's computer or other electronic device may then cause game information to be displayed on one or more associated displays.

The skill-based game device 122 may, as noted above, be part of a system which includes other devices. For example, as illustrated in FIG. 3B, in a casino environment, the skill-based game device 122 may communicate with one or more casino systems (such as over one or more networks such as the Internet, LANs, WANs, etc.), such as a player tracking server or system 202, an accounting system or server 204, a ticketing system, a bonusing system, a tournament system, other gaming machines, and external devices.

As one example, a player might sign up for a player rewards account and a casino funding account at the casino. The player might go to a device 100A to play a skill-based game and might select a particular event at the machine (such as "hit a 100 mph fastball"). The player might insert their player tracking card and PIN into the machine 122, which transmits that information to a player tracking system of the casino. This system identifies the player and notifies the skill-based game device 122, which in turn, notifies the server 200. The server 200 looks up the player and may transmit information back to the machine 122.

In one configuration, as illustrated in FIG. 3B, a central database 206 of players and information associated with those players may be maintained an updated (such as in a database associated with a central server), which database is utilized relative to a plurality of different gaming machines or devices.

In the embodiment just described, multiple skill-based gaming or presentation devices might be linked to one more servers or back end systems, such as which track players, player skill levels and the like, for the entire system of linked machines.

Of course, a gaming device or system may be configured in various fashions and be configured to present various skill-based gaming events (as described in more detail below). As one example, the skill-based gaming event might comprise a simulated golf event or activity and the device might comprise, at least in part, a sport or game simulation system such as described in PCT/US2015/055018, entitled SPORT AND GAME SIMULATION SYSTEMS WITH USER-SPECIFIC GUIDANCE AND TRAINING USING A DYNAMIC PLAYING SURFACE, the contents of which is incorporated herein by reference in its entirety as though set forth herein. Such a device might comprise the event presentation device of the invention, wherein the device is modified to include the features herein (e.g. determine and track player skill level, determine odds/payouts, receive wagers, etc.), and/or is linked to other devices or systems for implementing such features. For example, such a system may be used to present golf putting events where player putt a golf ball with a putter across the surface into a hole or at targets, where aspects of the playing surface may vary (such as by tilting it, where the hole location and/or distance can be varied, etc.) and where ending ball position, such as in the hole or hitting a target, or close to the hole/target, may result in a score.

Other configurations of devices and systems may be utilized to present skill-based games as used herein. For example, in one embodiment, a player might attempt to hit a ball which is pitched with a pitching machine. The pitching machine may be controlled by a processor or the like so as to set, for example, the speed or type of pitch, etc. The player might utilize a bat (where the particular bat which is provided may vary as described herein, such as being a wooden bat, an aluminum bat, etc.) to try and hit the ball. Sensors associated with the bat, image sensors or the like might monitor the player's input to determine whether the player hit the ball, the output of which is provided back to the processor for determining the outcome of the event.

As indicated herein, the invention may be applied to a wide variety of events. The configuration of the device or system for implementing the invention may vary depending upon the event or the environment. For example, as described above, in a casino setting, one or more dedicated gaming devices, such as the gaming device 122 illustrated in FIG. 3A, might be utilized to present the events described herein. However, the configuration of the device or system for presenting the invention may vary, such as when the present invention is implemented in other settings, which includes environments other than casinos. For example, the invention might be implemented relative to a golf course or a driving range where the player putts or hits a golf ball relative to a large physical range or outdoor putting green or golf hole/fairway. In such a configuration, the system of the invention might be similar to that illustrated in FIG. 4, where the input devices 250 comprise one or more user input devices, such as a mobile device 252, a kiosk 254, smart watch or fitness watch 256, etc.), the sensors 260 comprise one or more sensor or devices used to determine player actions (or the result thereof) and a computing device, such as a remote server 270. As one example, at a driving range, a tee box might include a user interface 250 which includes one or more user input devices such as buttons, a touch screen or the like, such as for the user to make selections of events, wagers, etc. as described herein. The interface 250 might also facilitate placement of a wager or entry fee, such as via a wager accepting device (such as a coin or bill validator) or by electronic payment (such as from a digital wallet or other electronic payment vehicle). In some embodiments, the interface 250 might, as indicated herein, include or comprise a user's device, such as a user's mobile communication or computing device 252, 256 that includes a browser interface to an event server or an application running on a processor of the user device. For example, the user device might comprise a tablet, phone, PDA or other device. Selections of events, placement of wagers, etc. may be received by the user interface and be provided to the remote server. Other types of interfaces or input devise may comprise kiosks and audio and/or video recognition devices (Amazon Echo, etc.). Such input devices or interfaces might be worn or be associated with other equipment (golf bag, golf clubs, hat, glasses, clothing, golf cart, etc.)

In such a configuration, various types of sensors or other devices might be used to determine, either directly or indirectly, the result of the player's inputs. These may include, but are not limited to, accelerometers, motion detecting devices, velocity measuring devices (radar, dual radar, Doppler radar, Lidar, etc.), distance measuring devices, force measuring devices (strain gauges, etc.), cameras or other image devices or sensors, identification tags (including but not limited to RFID tags, printed bar codes, etc.), location determining devices (GPS devices, etc.) pressure and/or mass sensors, light (visible or invisible) sensors, sound sensors, and others. For example, at a golf driving range, RFID tags may be associated with golf balls and those tags may be read, such as to determine a location where a ball is hit and thus the distance that the ball traveled, how close the ball is to the hole, etc. As another example, one or more cameras may track the path of a golf ball to determine the same or similar information. These or other sensors might be used to track the path or movement of a ball, the location of a ball, a hole sensor (such as for detecting a golf ball in the hole) etc., for determining an outcome of the event as to a particular player. Of course, the particular type of sensors or detector may vary, such as by the type of event, and might comprise more than one type of detector or sensor, including combinations of sensors or detectors, including in a mesh.

Such detectors or sensors might be positioned in various locations. For example, relative to a golf event, the detectors or sensors might be positioned at the tee box, in tee markers, in trees or bushes, in electrical or sprinkler boxes, at the pin or hole, around the green and/or fairway, on poles, on golf carts or other equipment. In some cases, detectors or sensors might be associated with arial craft such as blimps or drones.

Figure 4:
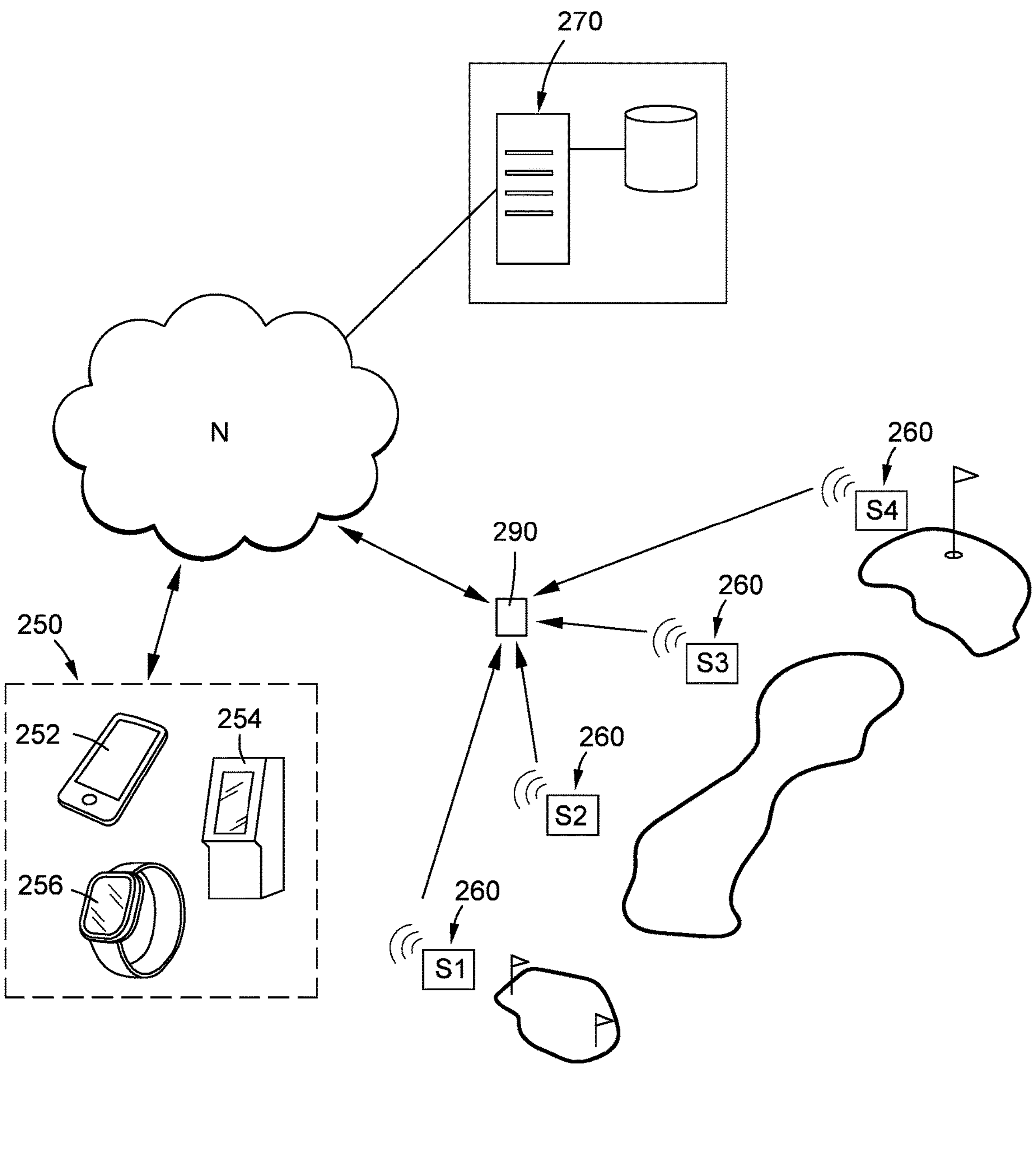
FIG. 4 illustrates an embodiment of a gaming system in accordance with another embodiment of the invention.

In some embodiments, the various input devices and detectors or sensors might be configured for wired communications, but most preferably wireless communications. For example, as illustrated in FIG. 4, the input devices and detectors or sensors might comprise Wi-Fi enabled devices which sync with one or more Wi-Fi communication hubs 290 for communicating with the remote server 270, such as via one or more networks N (WANs, LANs, the Internet, cellular network, etc.).

In some embodiments, the system may automatically track the activity of a player. For example, a player might elect to enter a game via an input to an application running on their mobile device. Using information from the mobile device or an associated network which provides the location of the user, the system may determine the location and then present the event to the user. This may involve collecting information from the detectors or sensors at the user's location (such as Hole #1 of ABC golf course) to determine the actions of the player and the results of the event (wherein information collected by the one or more detectors or sensors at the location is provided to the server for processing and determining the outcome of the event). Winnings might then be paid, for example, to an account of the user. In some embodiments, facial recognition may be used to verify the identity of the user, such as by one or more cameras at the location of the user capturing their facial image for comparison to a stored image (associated with the user who requested entry into the event via their mobile device, etc.).

Figure 5:
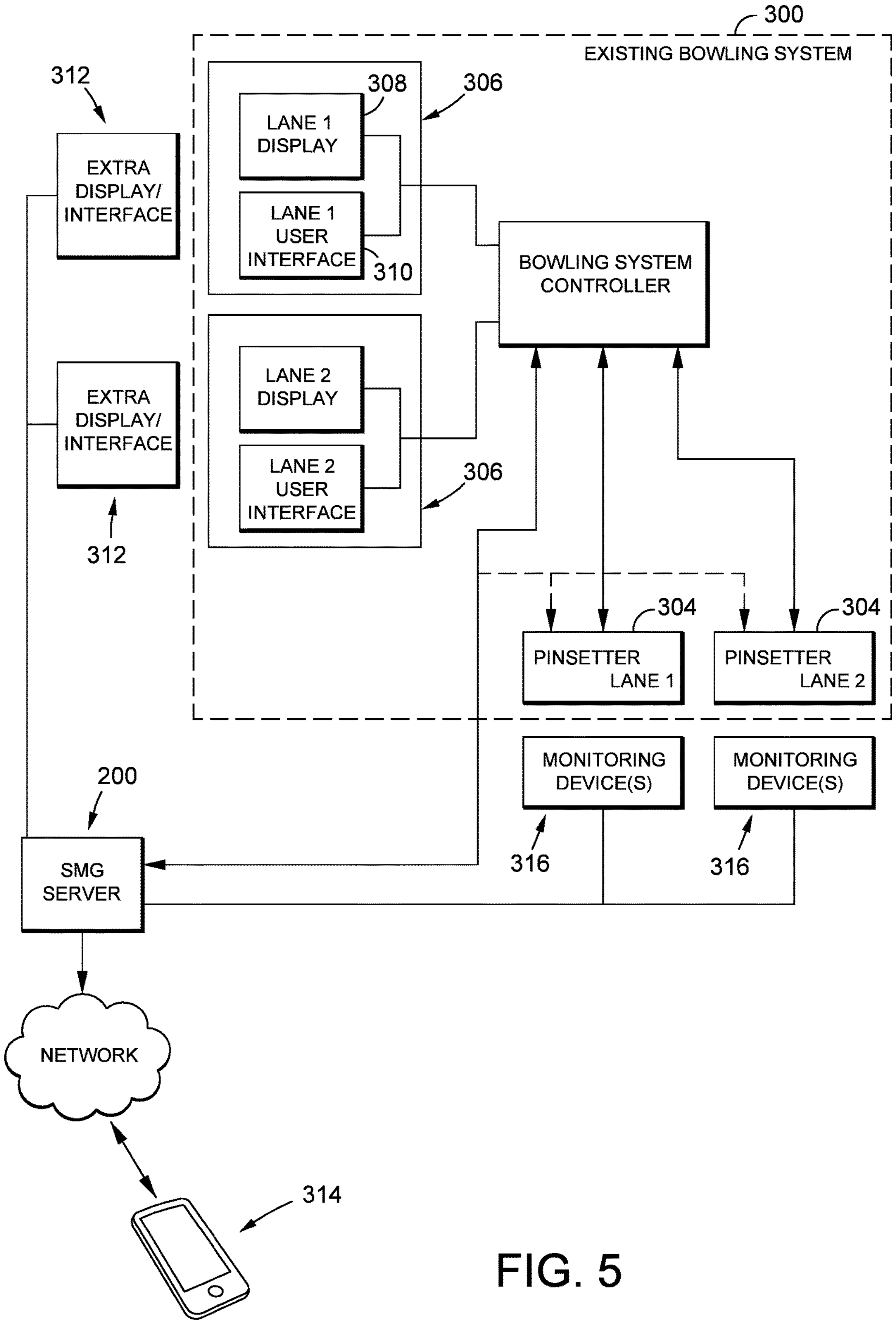
FIG. 5 illustrates yet another embodiment of a gaming system in accordance with the invention.

As another example, one or more systems for presenting a bowling wagering game are illustrated in FIG. 5. Such a system might comprise a completely new or custom-configured bowling system, or an existing bowling system which is modified to present the present invention, such as via integration with other devices.

In one embodiment, the at least one controller may comprise a game server 200 of the invention, a bowling system controller 300, or a combination thereof. The one or more player interfaces may comprise one or more of: (1) an existing bowling system interface 306, such as an existing lane display 308 and a lane user interface 310 (comprising one or more user input devices, such as a touchscreen, buttons, etc.) of an existing bowling system; (2) a separate or secondary user interface 312, such as video display with a touchscreen and/or other user input device(s), a kiosk, etc., and/or a player's device 314, such as a user's mobile communication device (phone, tablet, etc.). The one or more event monitoring devices may comprise, for example, an existing bowling lane pinsetter 304 or other pin monitoring technology (cameras, etc.) used by the bowling system, or separate or secondary event monitoring devices 316, such as pin RFID readers, cameras or other sensors or devices. The one or more game presentation devices may comprise, for example, the lane pinsetters 304 and/or other equipment for presenting the bowling game.

As one example, in one embodiment, an existing bowling system 300 may essentially be integrated with a game server 200 in order to implement the present invention. For example, the existing bowling system 300 might be modified (such as with updated software executed by the bowling system controller 302, including one or more API's) to send information to and receive information from the game server 200. In one example of the use of such a system, the bowling system controller 302 might be configured receive player identification or login information at the existing lane interface 306 and, when received, transmit that information to the game server 200, thus allowing the game server 200 to identify the player. In response to a player's request to play a wagering game of the invention (such as input to the lane interface 306, including a wager or entry fee of an amount), the game server 200 may deduct the wager or entry fee from a player's account or balance of funds (or from other provided funds) and then present one or more game options to the player. These options may be routed from the game server 200 to the bowling system controller 302 for presentation at the lane presentation device 306. When multiple game options are presented, the player might select one of the game options, or when a single option is provided, might select "start game." The game server 200 may then cooperate with the bowling system controller 302 to present the game, such as by the game server 200 sending instructions to the bowling system controller 302 with game data, such as the number and/or arrangement of pins that the bowling system controller 302 should instruct the lane pinsetter 304 to set. The bowling system controller 302 may send instructions to the pinsetter 304 and then receive information back from the pinsetter 304 regarding the results of the player's roll, such as the number of pins knocked down. This information may be transmitted to the game server 200 for determining the outcome of the game (based upon one or more rolls, etc.), and the result of the game may be presented to the player via the lane interface 306 (such as "Congratulations, you WON $100"), and wherein a player might be awarded winnings to a player account or the like.

In another embodiment, the existing bowling system 300 might be modified to present wagering games of the invention and/or be custom configured to present wagering games of the invention, wherein the bowling system controller 302 may be modified to perform the functions of the game server, such as via updated software. In such a configuration, the existing bowling system 300 may essentially be modified to comprise a game system of the present invention.

In yet another embodiment, a system of the invention might comprise other combinations of existing bowling system features and additional devices. For example, in one embodiment, instead of using the existing lane interface 306 to receive player input and present game information, secondary device(s) might be used. For example, a player might download a game application onto their user device 314 and provide inputs to the application, such as player identification information, wager inputs, etc., and wherein game information may then be presented to the user via their device (via the application). In another embodiment, as illustrated in FIG. 5, one or more secondary displays or interfaces 312 may be located at an existing bowling lane (such as in addition to the existing lane interfaces 306) for receiving player inputs, displaying game information and the like. In this manner, the existing lane interface 306 may display information and receive inputs relative to the existing bowling system controller 302, and the game server 200 may receive game play inputs and display game information via the secondary displays or interfaces 312.

Also, the game server 200 may communicate directly with the pinsetter 304, such as for setting pins in a unique configuration (by-passing the bowling system controller 302).

In one embodiment, the game server 200 may also receive game play information from one or more secondary or separate monitoring devices or sensors 316. For example, instead of modifying the bowling system controller 302 to permit communications between the game server 200 and the bowling system controller 302, such as to receive information from the pinsetter 304 about how many pins a player knocked down, one or more additional monitoring devices 316 might be associated with a bowling lane (such as cameras, etc., as noted above), whereby game result information may be independently obtained/determined and provided to the game server 200.

Of course, other variations of systems may be utilized to implement the invention. For example, a system might include a player kiosk. In the case of a bowling alley, a kiosk might be centrally located or kiosks might be located at each lane. The player might utilize the kiosk as input device to either the gaming server 200 and/or bowling system controller 302, such as to reserve and/or pay for a lane, place one or more wagers, select games to play, etc.

As indicated herein, in one embodiment of the invention, a player may elect to play a wagering game, such as a bowling game, and a user interface may be configured to display various wagering opportunities which can be selected by the player. In similar fashion to play of a gaming device or machine 100A,B described herein, relative to a bowling event, a player might select a desired "Event with 10:1 Payout" option. Upon receiving such an input from the player, the server 200 may determine or more events having odds which have an associated 10:1 payout ability, based upon certain game equipment. The events might comprise a single event or multiple events, where the player can select one of the events from the different options.

As indicated herein, in one embodiment, a player may make a selection of particular game equipment, which selection then results in the determination of odds of success and an associated payout for a winning result. In other embodiments, the gaming device or system may make such a selection. In either case, the gaming device, system or the like is then configured to implement the skill-based gaming event using the selected gaming equipment. As indicated, in some embodiments, this may comprise providing physical equipment (clubs, balls, bats, game tiles, game cards, game pieces, etc.) that comprise the designated equipment. In other embodiments, this may comprise providing a virtual set of game equipment, such as a set of virtual clubs, balls, game tiles, game cards, etc.), wherein the assigned virtual game equipment associated characteristics which may vary from the characteristics of other virtual game equipment.

Other Variables

As indicated herein, variability in game equipment is preferably utilized in the presentation of a skill-based event, in relation to the odds and payouts for the event. However, it will be appreciated that other variables or factors may be utilized.

For example, as illustrated in FIG. 1A, in one embodiment, a skill level of the player might also be used to determine the odds or probability of success for an event. The principles of determining a player skill level and using a player skill level relative to a skill-based gaming event are detailed in U.S. Pat. No. 10,363,503, which is co-owned with the present application and which is incorporated herein in its entirety by reference.

As one example, a skill-based event might comprise an event where a player attempts to drive a golf ball at least 300 yards. As indicated herein, the probability of success, and thus the payout, might be determined by whether the event is played using a 1-wood drive or a 3-wood. However, the probability of success might also be determined in relation to a skill level of the player. For example, a pro-level player will have a higher probability of success in either case, as compared to a novice golfer.

Additional Aspects of the Invention

As indicated herein, the types of skill-based gaming events to which the present invention are applicable are limitless. Further, the events may comprise individual events, or combinations of events—such as two or more activities which are combined to comprise a single event (for purposes of determining the outcome). For example, the player might place a wager or entry fee than they can successfully drive a golf ball 300 yards and putt a golf ball 20 feet into the hole, hit five of ten baseball pitches or the like.

As noted above, aspects of the invention may be implemented by various configurations of systems of the invention. In one embodiment, such a system comprises at least one controller, one or more event monitoring devices, one or more player interfaces, and preferably, one or more game or event presentation devices.

The skill based gaming event requires one or more physical player actions or inputs. However, the type of skill based gaming event may vary. In one embodiment, the skill-based event may be live, virtual or a combination thereof. For example, the skill based gaming event might comprise hitting a baseball. The player might swing a physical bat and a physical ball in this event. Alternatively, the player might swing a physical bat at a virtually pitched ball, such as one which is shown on a video screen (combination of live/real and virtual). As another example, a player might throw a virtual baseball by simply moving their arm in a pitching motion relative to a plurality of sensors. Thus, the invention can be implemented relative to a wide variety of different skill-based activities or events.

As indicated above, in one embodiment of the invention, a payout for a winning game outcome may be determined based upon the player's wager or entry fee and the calculated or determined likelihood that the player will successfully complete the event (e.g. obtain a winning outcome), which likelihood is based upon the determined player skill level in relation to the difficulty of the event.

It will be appreciated that certain events may have a difficulty which results in a very high probability of the player obtaining a winning outcome—such as a 99-100% probability of a winning outcome. In such instances, the system and method of the invention may be configured to eliminate or not present those events to the player, since there is effectively no "risk" or chance that the player will lose the event. For example, a particular virtual racing game may require a player to travel around a track in less than 2 minutes. A particular virtual race car may have the capability of traversing the track in less than 1 minute, such that a player would only lose by essentially intentionally driving off of the track. As a result, that virtual race car might not be made available or used for that particular race.

In other variations, when it is determined that the probability of success is very high, the amount that the player is permitted to wager or entry fee and/or the amount that is paid in winnings, may be reduced greatly, thus reducing the risk of the game to the house. For example, if the probability of success as to the player for a particular event is 95% and the payout is set to 10% of the wager or entry fee, instead of permitting the player to wager up to $100, the player might only be permitted to wager up to $1 (thus causing the maximum winnings payable to the player to go down from $10 to $0.10) or by simply reducing the payout to a minimal value (e.g. even a $100 wager or entry fee only pays $0.10 if won by the player), whereby the player is disincentivized from the playing the game and/or the amounts paid by the house to such a player is so small that it can be absorbed into the total return to the house against all players.

As described, the invention may be implemented in a "player vs. machine" type format, such as where a single player places a wager or entry fee on the outcome of a skill based event presented via the device and the player's outcome is then evaluated. In casino terminology, such event is essentially a "player v. house" event.

Of course, the invention might be applied to other types of wagering configurations. As one example, the present invention may apply to as few as one player or multiple players. For example, as detailed above, a single player might place a wager or entry fee that they will achieve a successful skill-based gaming event outcome and that single player may then participate in the event and the outcome is determined based upon that single player's performance. However, in other embodiments of the invention, players may play against one another, and/or two or more players (a "Group") may participate in one or more events as part of a game.

Advantages and Other Aspects of the Invention

One aspect of the invention is a system and method where players are rewarded for an outcome of a skill-based event, based upon criteria dictated before the player's action(s) in the event. If a player successfully completes their task, they win their wager or entry fee and the associated payout.

A particular advantage of the invention is that it creates variability in events and accounts for advantages or disadvantages that result from use of different gaming equipment. A common problem with virtual games is that different game equipment can significantly affect the probability of success as to a player or between players. This is a significant problem when presenting skill-based wagering events, because that variability inhibits stability in calculating the probabilities of success and thus amounts that can be paid for winning outcomes. Further, it disadvantages players who do not have the same game equipment.

In a preferred embodiment, the invention does not include a random number generator nor attempt to create or re-create an event where the outcome is randomly determined, such as in a game of slots. In one embodiment, the challenge associated with a game or event of the invention is clearly stated or defined to the player before the game or event starts (including relative to the defined payouts), with the players' skill being the determinant of the outcome (win/loss) of the event and the associated payout.

This novel method of game creation is different than other gaming systems which present a constant game and payout for all players. Moreover, the payouts are entirely known without any randomness. For example, in contrast to a slot game where the outcome is random and/or the award may vary, in accordance with the present invention, the player knows that their successful skill (without being modified, such as by the system) in achieving the required outcome will result in a particular payout. Thus, a player can, through their own action and skill, win an award by successfully completing the known event.

Aspects of the invention may thus comprise, but are not limited to one or more of:

A wagering skill game which has winning and losing outcomes, where prizes for winning outcomes are fixed and depend only on the outcome of the skill game;

A method of awarding payouts for a skill game where the award is solely determined by whether the player wins or loses the skill game;

A wager-based skill game where awards are based upon the skill of the player(s) and not randomly determined; and A method/system for non-randomized awards for a wagering skill game.

In accordance with the present invention, because a detailed and reliable player skill level can be determined, games can be created to maximize engagement while optimizing monetary sustainability for wagering. For example, wagering events can be specifically structured to provide specific long-term return-to-player (such as a particular RTP of 85% over time), so that in aggregate, the game is profitable, but any specific player may win in the short-term or even the long-term based on their individual performance.

Yet another advantage of embodiment of the invention is that wagering events are presented or played against the house. In the prior art, competitions between players are known. As indicated above, however, this requires two or more players to play against one another to engage in the game. In accordance with the invention, wagering games can be presented to a single player by making the wager against the house. A particular aspect of the invention is a method and system which configures the games so that the wagers are made against the house (e.g. by the house determining event difficulty based and/or payouts for an event having a particular difficulty, whereby the odds of the event are tailored to allowing wagers to be made in a manner which permits payment of winnings for winning outcomes but also rete The invention thus has a wide range of applicability to individuals and businesses, such as players of games like virtual golf, bowling, and other games, including but not limited to video games, and businesses looking to create increased engagement and a new revenue stream through wagering will use this invention to make their games more interesting and profitable.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for presenting a skill-based gaming event to a player comprising:

a game server comprising a processor, a memory, at least one sensor configured to sense an action associated with input by a player to an element of physical game equipment associated with a set of game equipment, and a communication interface;

machine readable code fixed in a tangible medium and configured, when executed by said controller, to cause said processor of said game server to determine said set of game equipment used by said player in playing said skill-based gaming event, said selected set of game equipment selected from at least a first set of game equipment and a second set of game equipment, wherein said first set of game equipment is associated with first odds of achieving a winning outcome of said skill-based gaming event and said second set of game equipment is associated with second odds of achieving a winning outcome of said skill-based gaming event;

machine readable code fixed in a tangible medium and configured, when executed by said controller, to cause said processor of said game server to determine a payout value for a winning outcome of said skill-based gaming event based upon said selected set of game equipment and the odds associated therewith;

machine-readable code fixed in a tangible medium and configured, when executed by said controller, to cause said controller of said game presentation device to, upon placement of a wager by said player, present said skill-based gaming event to said player, comprising displaying game event information to said player via said at least one video display, wherein said skill-based game event is played with said selected set of game equipment;

machine-readable code fixed in a tangible medium and configured, when executed by said controller, to cause said controller of said game presentation device to determine an outcome of said at least one skill-based gaming event based at least in part upon an output of said at least one sensor relative to said sensed action; and machine-readable code fixed in a tangible medium and configured, when executed by said controller, to cause said controller of said game presentation device to award an award to said player in the event of a winning outcome of said at least one skill-based gaming event, a size of said award dependent at least in part upon said payout value.

2. The system in accordance with claim 1, wherein said game presentation device further comprises at least one monetary value input device for receiving an item having associated monetary value, said controller configured to generate a credit balance in response to the player providing said item having associated value.

3. The system in accordance with claim 1, wherein said element of game equipment comprises a golf club, said input comprise a swing of said golf club, and wherein said first set of game equipment comprises at least one first golf club and said second set of game equipment comprises at least one second golf club that differs from said first golf club.

4. The system in accordance with claim 1, wherein said selected set of game equipment is selected by input by said player.

5. The system in accordance with claim 1, wherein said selected set of game equipment is selected by said game server.

6. The system in accordance with claim 1, wherein said payout value is further determined with reference to a skill level of said player.

7. The system in accordance with claim 1, wherein said skill-based gaming event comprises a golf event and said first and second sets of game equipment comprise at least one of different numbers of golf clubs and different golf clubs.

8. The system in accordance with claim 1, wherein said skill-based gaming event comprises a racing game and said first and second sets of game equipment comprise at least one of a different vehicles and similar vehicles having different characteristics.

9. A method of presenting a machine-implemented skill-based gaming event comprising the steps of:

receiving at a game server, from a gaming device configured to present at least one skill-based gaming event, information from at least one sensor of an action associated with at least one input from a player to a golf club associated with a selected set of game equipment used in playing said skill-based gaming event, said selected set of game equipment selected from at least a first set of game equipment which comprises at least one first golf club and a second set of game equipment which comprises at least one second golf club, wherein said first and second golf clubs vary by at least one of type and number, wherein said first set of game equipment is associated with first odds of achieving a winning outcome of said skill-based gaming event and said second set of game equipment is associated with second odds of achieving a winning outcome of said skill-based gaming event;

determining, at said game server, a payout value for a winning outcome of said event, said payout value based upon said selected set of game equipment and the odds associated therewith;

transmitting said payout value from said game server to said gaming device;

accepting a wager from said player to participate in said skill-based gaming event;

presenting said one skill-based gaming event to said player using said selected set of game equipment;

determining, at said gaming device, an outcome of said skill-based gaming event based at least in part on said information received from said at least one sensor; and awarding an award to said player in the event of a winning outcome of said skill-based gaming event, a size of said award dependent at least in part upon said payout value.

10. The method of claim 9, wherein said game presentation device further comprises at least one monetary value input device for receiving an item having associated monetary value, said controller configured to generate a credit balance in response to the player providing said item having associated value.

11. The method in accordance with claim 9, wherein said at least one sensor comprises a motion detection device and said input comprises a swing of said golf club.

12. The method in accordance with claim 9, wherein said payout value is further determined with reference to a skill level of said player.

13. The method in accordance with claim 9, wherein said gaming device comprises at least one mobile communication device which is in communication with said at least one sensor which is associated with said selected set of game equipment for receiving an output of said sensor based upon use of said selected set of game equipment by said player.

14. A system for presenting a skill-based gaming event to a player comprising:

a game server comprising a processor, a memory, at least one sensor configured to sense a player's swing of a golf club and associated movement of a golf ball, wherein said golf club is associated with a set of game equipment, and a communication interface;

machine readable code fixed in a tangible medium and configured to cause said processor of said game server to determine said set of game equipment used by said player in playing said skill-based gaming event, said selected set of game equipment selected from at least a first set of game equipment which comprises at least one first golf club and a second set of game equipment which comprises at least one second golf club, wherein said first and second golf clubs vary by at least one of type and number;

machine readable code fixed in a tangible medium and configured to cause said processor of said game server to determine odds of achieving a winning outcome of said skill-based gaming event using said selected set of game equipment, wherein said odds vary depending upon whether said selected set of game equipment comprises said first set or said second set of game equipment;

machine readable code fixed in a tangible medium and configured to cause said processor of said game server to determine a payout value for a winning outcome of said event based upon said odds;

machine-readable code fixed in a tangible medium and configured to cause said controller of said game presentation device to, upon placement of a wager by said player, present said skill-based gaming event to said player with said selected set of game equipment;

machine-readable code fixed in a tangible medium and configured, when executed by said controller, to cause said controller of said game presentation device to determine an outcome of said at least one skill-based gaming event based at least in part upon input by information from said at least one sensor regarding said swing and said movement of said golf ball; and machine-readable code fixed in a tangible medium and configured to cause said controller of said game presentation device to award an award to said player in the event of a winning outcome of said at least one skill-based gaming event, a size of said award dependent at least in part upon said payout value.

15. The system in accordance with claim 14, wherein said set of game equipment is selected by input by said player.

16. The system in accordance with claim 14, further comprising machine-readable code fixed in a tangible medium and configured, when executed by said controller, to cause said controller to cause at least one video display to display game information to said player regarding said skill-based gaming event.

17. The system in accordance with claim 1, wherein said element of physical game equipment comprises a bowling ball, and said first and second sets of game equipment comprise at least one bowling ball and a bowling lane.

* * * * *